US011775089B2

(12) United States Patent
Cho (10) Patent No.: US 11,775,089 B2
(45) Date of Patent: Oct. 3, 2023

(54) USER INTERFACE DEVICE

(71) Applicant: SEOYON E-HWA CO., LTD., Anyang (KR)

(72) Inventor: Ju Hwan Cho, Incheon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 0 days.

(21) Appl. No.: 17/820,611

(22) Filed: Aug. 18, 2022

(65) Prior Publication Data

US 2023/0134716 A1    May 4, 2023

(30) Foreign Application Priority Data

Oct. 29, 2021  (KR) .................. 10-2021-0146580

(51) Int. Cl.
*G06F 3/0362*   (2013.01)
*G06F 1/16*     (2006.01)

(52) U.S. Cl.
CPC .......... *G06F 3/0362* (2013.01); *G06F 1/1681* (2013.01)

(58) Field of Classification Search
CPC .................. G06F 3/0354–0362; G06F 1/1681
See application file for complete search history.

(56) References Cited

U.S. PATENT DOCUMENTS

| | | | | |
|---|---|---|---|---|
| 2006/0258302 A1* | 11/2006 | Ding | ................... | H04M 1/0247 455/90.3 |
| 2014/0350784 A1* | 11/2014 | Imai | ...................... | G06F 3/0393 701/36 |
| 2017/0153718 A1* | 6/2017 | Brown | ................... | B60K 37/06 |

FOREIGN PATENT DOCUMENTS

| | | |
|---|---|---|
| CN | 113179049 A | 7/2021 |
| JP | 2019204769 A | 11/2019 |
| KR | 101501141 B1 | 3/2015 |
| KR | 101537023 B1 | 7/2015 |
| KR | 101829376 B1 | 2/2018 |
| KR | 101955419 B1 | 5/2019 |
| KR | 20200071835 A | 6/2020 |

\* cited by examiner

*Primary Examiner* — Hang Lin
(74) *Attorney, Agent, or Firm* — Harvest IP Law, LLP

(57) ABSTRACT

Disclosed herein a user interface device includes a display; a rail extending in a first direction parallel to the display; a hinge configured to slide along the rail in the first direction; a knob coupled to the hinge to slide in the first direction on a display surface and configured to detect a rotation input; and a magnet holder disposed to face the hinge in a second direction of the hinge and extending in the first direction; wherein the first magnet is provided on the hinge, the magnet holder is provided with a second magnet and a third magnet, the second and third magnets have different magnetic poles from that of the first magnet on facing surface thereagainst, and the first magnet reacts by an magnetic force of the second and third magnets so that the knob is held to a first position or a second position, respectively.

8 Claims, 8 Drawing Sheets

USER INTERFACE DEVICE

CROSS-REFERENCE TO RELATED APPLICATION(S)

This application is based on and claims priority under 35 U.S.C. § 119 to Korean Patent Application No. 10-2021-0146580, filed on Oct. 29, 2021 in the Korean Intellectual Property Office, the disclosure of which is incorporated herein by reference in its entirety.

TECHNICAL FIELD

The disclosure relates to a user interface device, and more particularly, to a user interface device in which a knob for detecting a rotation input is positioned on a display and a display screen displayed on the display may be changed by moving the position of the knob.

BACKGROUND

In general, vehicles have a center fascia, which is provided with various systems that may be controlled by a user. For example, such various systems provided in a center fascia of a vehicle include navigation, radio, and air conditioning control system, and the like. To control such various systems, an input device for receiving a user's input may be provided.

Meanwhile, an output device for outputting information from such various systems may be provided in a center fascia of a vehicle. Conventionally, simple output devices such as an indicator lamp are provided in order to output information, but nowadays, a large display may be used in order to output various information to a user as needed. Furthermore, by providing a touch input means in a large display device, a user may intuitively perform an input according to output contents.

Recently, as a device for manipulating in-vehicle devices, development of knob-on-display technologies that may provide driving environment information through a display and control in-vehicle systems through a physical manipulation method has been ongoing. A knob allows a driver to manipulate devices precisely without taking their eyes off a road, and enables intuitive and physical control through a moderate sense of resistance.

However, such a knob may detect only a simple rotation input, so study on a user interface device that allows a user to control a system through various inputs is required.

SUMMARY

An aspect of the disclosure is to provide a user interface device in which a knob for detecting a rotation input is positioned on a display and a display screen displayed on the display may be changed by moving the position of the knob.

Additional aspects of the disclosure will be set forth in part in the description which follows and, in part, will be obvious from the description, or may be learned by practice of the disclosure.

In accordance with an aspect of the disclosure, a user interface device includes a display; a rail extending in a first direction parallel to the display at one side of the display; a hinge configured to slide along the rail in the first direction; a knob coupled to the hinge to slide in the first direction on a display surface of the display and configured to detect a rotation input; and a magnet holder disposed to face the hinge in a second direction of the hinge and extending in the first direction; wherein the first magnet is provided on the hinge, the magnet holder is provided with a second magnet and a third magnet, the second and third magnets have different magnetic poles from that of the first magnet on facing surface thereagainst, and the first magnet reacts by an magnetic force of the second and third magnets so that the knob is held to a first position or a second position, respectively, on the display surface of the display.

The user interface device may further include a hinge sensor configured to detect a position of the hinge.

A display content displayed on the display may be switched depending on an output of the hinge sensor.

Upon determining that the knob is positioned at the first position by the output of the hinge sensor, the display may display a first display content predetermined, and upon determining that the knob is positioned at the second position, the display may display a second display content predetermined.

The first display content may include a first image displayed in a first area including the first position.

The second display content includes a second image displayed in a second area including the second position.

The knob may include a hollow portion, the first display content includes a first image displayed on the first position, the second display content includes a second image displayed on the second position, and the first and second images are seen through the hollow portion.

The user interface device may further include a case in which the rail and the magnet holder are accommodated therein so as not to be exposed to the outside.

The knob is configured to slide while spacing apart from the display surface of the display by a predetermined distance.

BRIEF DESCRIPTION OF THE DRAWINGS

These and/or other aspects of the disclosure will become apparent and more readily appreciated from the following description of the exemplary embodiments, taken in conjunction with the accompanying drawings, of which.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
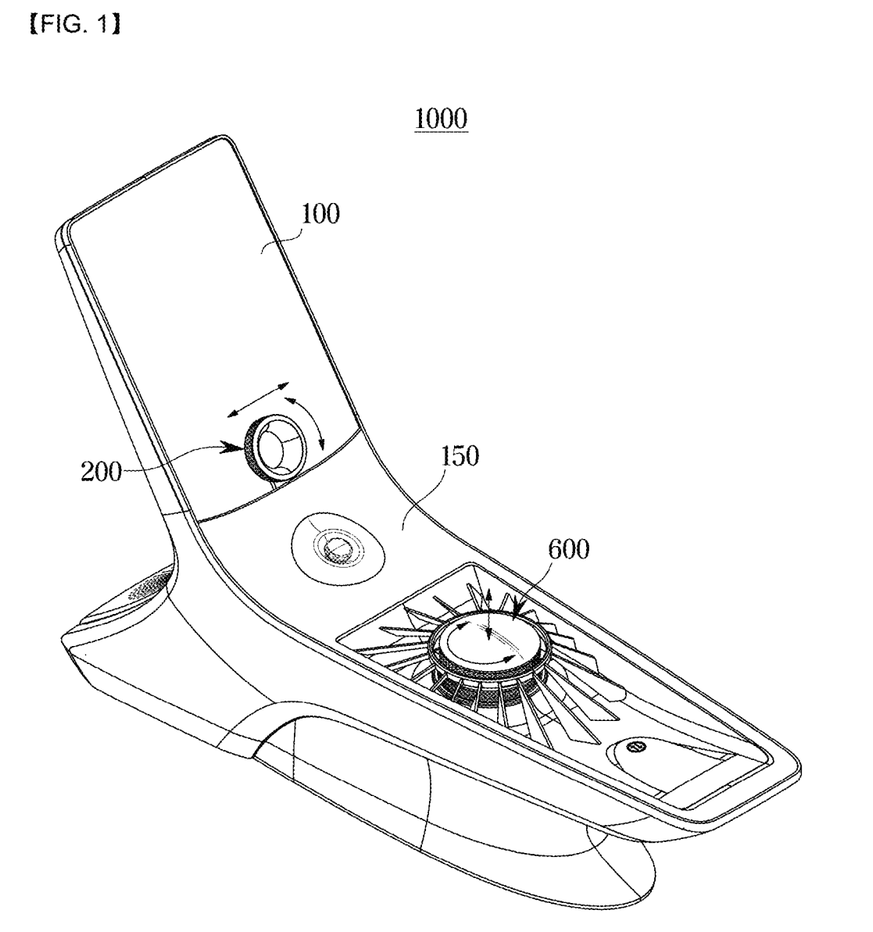
FIG. 1 is a schematic view illustrating a user interface device according to an embodiment of the disclosure.
Figure 2:
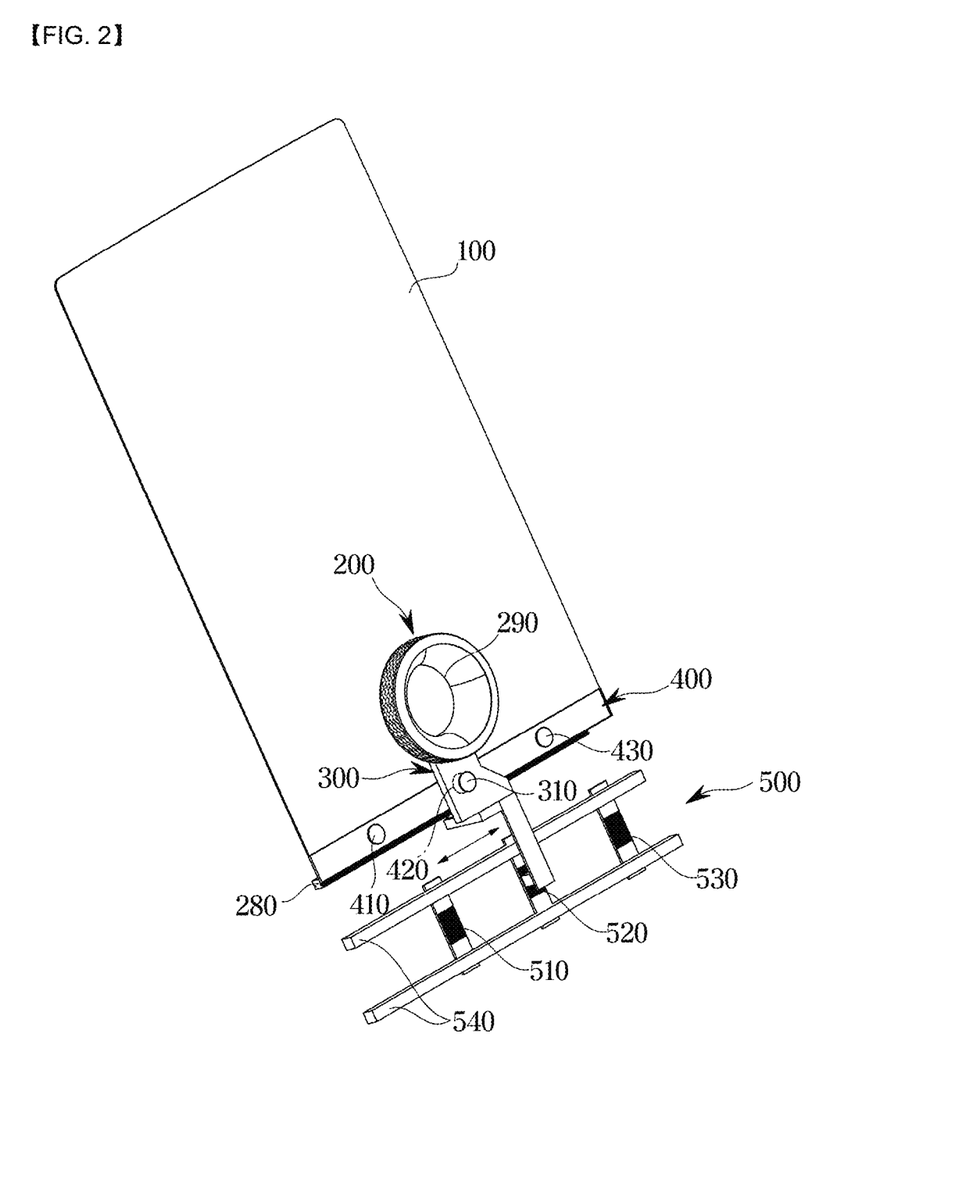
FIG. 2 is a schematic view illustrating a configuration of a user interface device according to an embodiment of the disclosure.
Figure 3:
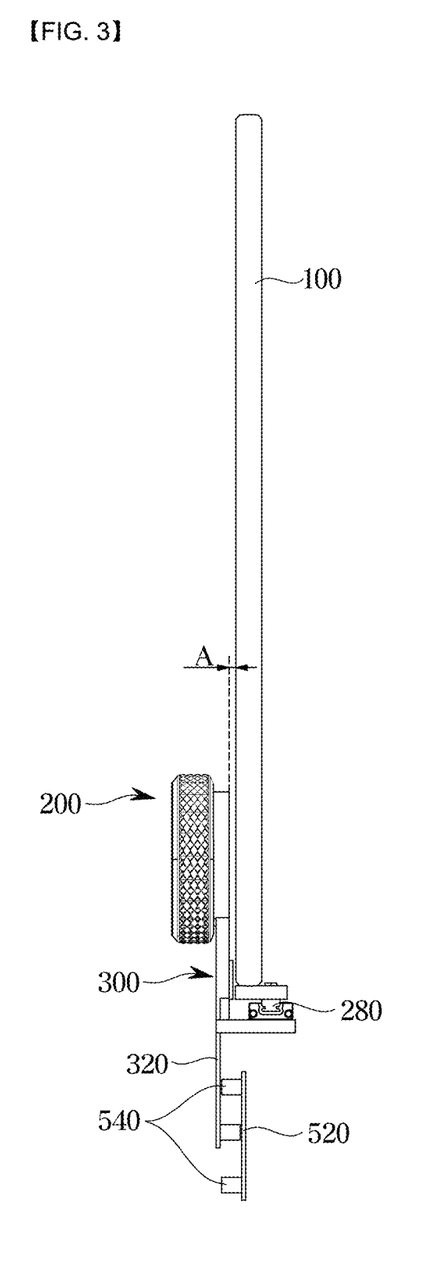
FIG. 3 is a schematic view illustrating a configuration of a user interface device according to an embodiment of the disclosure.

FIG. 1 is a schematic view illustrating a user interface device according to an embodiment of the disclosure, and FIGS. 2 and 3 are schematic views illustrating a configuration of a user interface device according to an embodiment of the disclosure.

A user interface device 1000 may be provided on a center fascia of a vehicle to concisely provide driving environment information through a display 100, and at the same time, control an in-vehicle system through a physical manipulation method of a knob 200. The knob 200 may slidably move on a display surface of the display 100 and may detect a rotation input.

Referring to FIGS. 2 and 3, the user interface device 1000 may include the display 100, a rail 280 provided to extend in a first direction (indicated by an arrow in FIG. 2) parallel to the display 100 on one side of the display 100, a hinge 300 sliding along the rail 280 in the first direction, the knob 200 coupled to the hinge 300 to slide in the first direction on the display surface of the display 100 and detect the rotation input, a magnet holder 400 disposed in a second direction of the hinge 300 opposite to the hinge 300 and extending in the first direction, and a hinge sensor 500 detecting a position of the hinge 300.

Meanwhile, as shown in FIG. 1, the user interface device 1000 may further include a case 150 in which the rail 280, the magnet holder 400, and the hinge sensor 500 are accommodated therein so as not to be exposed to the outside. The case 150 may be provided to cover an area close to the knob 200 in order to minimize the exposure of the hinge 300, and the hinge 300 may have a surface similar to the material of the display 100 so as not to be not easily noticeable on the display 100.

The display 100 may display information necessary for a user. For example, the display 100 may be a touch display device including a touch panel (not shown). The user may input information into the user interface device 1000 through such a touch panel or may input information through a manipulation of the knob 200.

The knob 200 may detect a rotation input by a user's manipulation. To this end, the knob 200 may include a knob body that rotates about a rotation axis. The knob 200 may include a hollow portion 290.

The knob 200 is coupled to the hinge 300, and the hinge 300 may slide along the rail 280 in the first direction. Accordingly, the knob 200 may also slide in the first direction. At this time, the knob 200 may slide on the display surface of the display 100.

On the other hand, the hinge sensor 500 detects a position of the hinge 300. Because the hinge sensor 500 detects the position of the hinge 300, the user may input information into the user interface device 1000 through the hinge sensor 500 by sliding the knob 200 coupled to the hinge 300 to move the position of the hinge 300.

Accordingly, the user may input information by touching the display surface of the display 100, or may input information by sliding or rotating the knob 200 positioned on the display surface.

On the other hand, as shown in FIG. 3, the knob 200 may be slid while spacing apart from the display surface of the display 100 by a predetermined distance A. As such, the knob 200 moves apart from the display surface of the display 100, so that damages to the display surface may be prevented and further erroneous input to the touch panel provided on the display surface may be prevented.

On the other hand, as shown in FIG. 2, the hinge 300 may be provided with a first magnet 310, and the magnet holder 400 may be provided with a second magnet 410, a third magnet 420, and a fourth magnet 430. Furthermore, the second, third and fourth magnets 410, 420 and 430 have different magnetic poles from the first magnet 310 on facing surface thereagainst. At this time, the first magnet 310 reacts by the magnetic force of the second magnet, the third magnet and the fourth magnet 410, 420 and 430, so that the knob 200 may be held a first position, a second position, and a third position on the display surface of the display 100, respectively.

In other words, because an attractive force acts between the plurality of magnets 410, 420 and 430 and the first magnet 310 of the hinge 300, when the first magnet 310 of the hinge 300 is positioned at a position corresponding to each of the plurality of magnets 410, 420 and 430 of the magnet holder 400, the facing magnets may be held by an magnetic force.

In the case of that three magnets 410, 420 and 430 are provided in the magnet holder 400, the hinge 300 may be held at three positions corresponding to each magnet, and accordingly, the knob 200 coupled to the hinge 300 may also be held to three positions (a first position, a second position, and a third position) on the display surface of the display 100.

On the other hand, as shown in FIGS. 2 and 3, the hinge sensor 500 may detect a position of an extension portion 320 extending to one side from the hinge 300. The extension portion 320 extends from the hinge 300 to one side (a lower side in FIG. 3), and the hinge sensor 500 may detect the position of the extension portion 320 through a plurality of sensors 510, 520 and 530 fixed to the hinge sensor fixing portion 540, thereby detecting the position of the hinge 300.

Meanwhile, the number of sensors of the hinge sensor 500 may match the number of magnets provided in the magnet holder 400. At this time, each sensor 510, 520 and 530 of the hinge sensor 500 may detect the position of the hinge 300 fixed by each magnet 410, 420 and 430 of the magnet holder 400. In other words, the first hinge sensor 510 may detect whether the knob 200 is at the first position in response to that the first magnet 310 of the hinge 300 is held by the magnetic force of the second magnet 410 of the magnet holder 400. Furthermore, the second hinge sensor 520 may detect whether the knob 200 is at the second position in response to that the first magnet 310 of the hinge 300 is held by the magnetic force of the third magnet 420 of the magnet holder 400. Furthermore, the third hinge sensor 530 may detect whether the knob 200 is at the third position in response to that the first magnet 310 of the hinge 300 is held by the magnetic force of the fourth magnet 430 of the magnet holder 400.

Figure 4A:
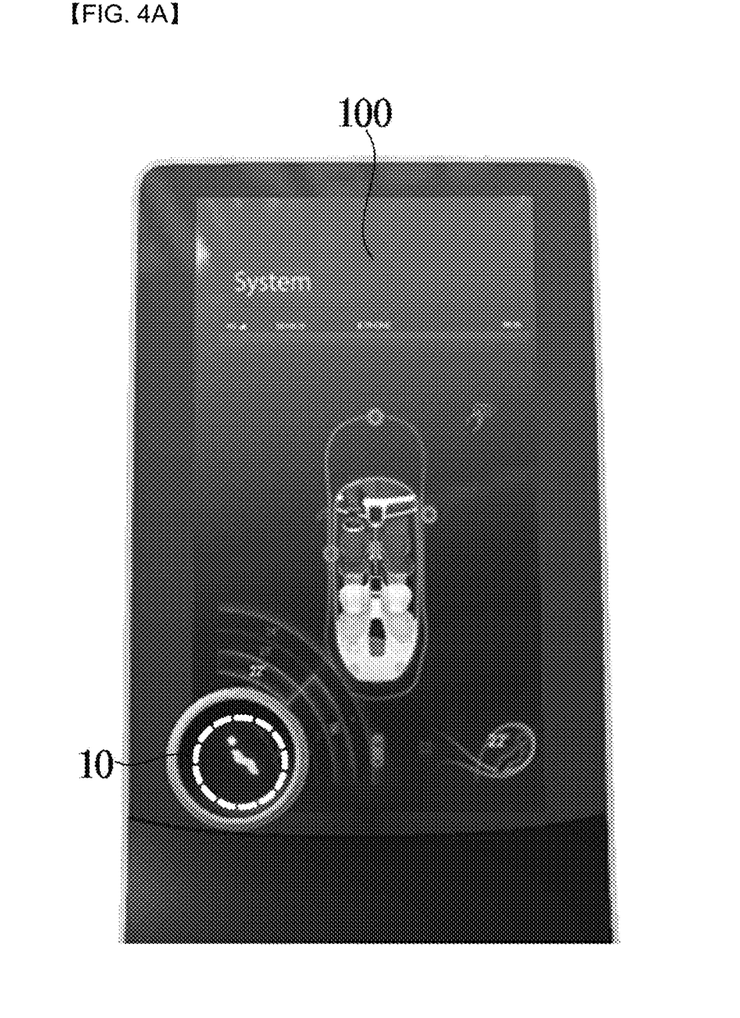
FIGS. 4A to 4C are schematic views illustrating a state in which display contents are switched according to positions of a knob in a user interface device according to an embodiment of the disclosure.
Figure 4B:
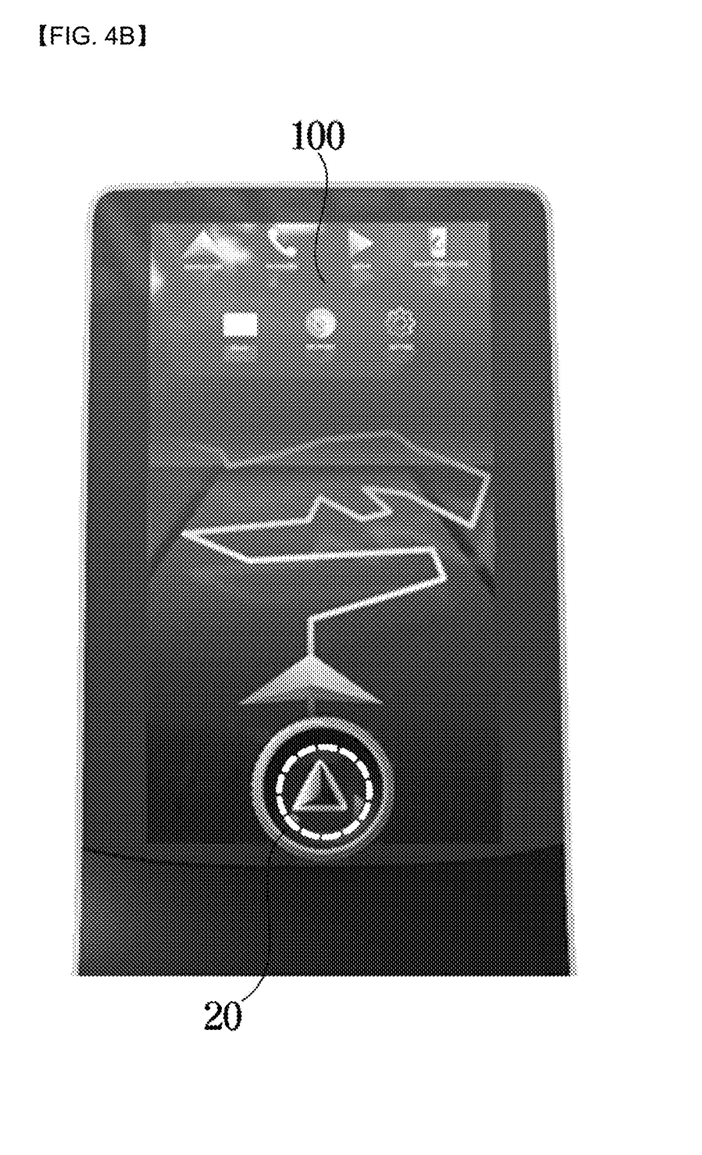
Figure 4C:
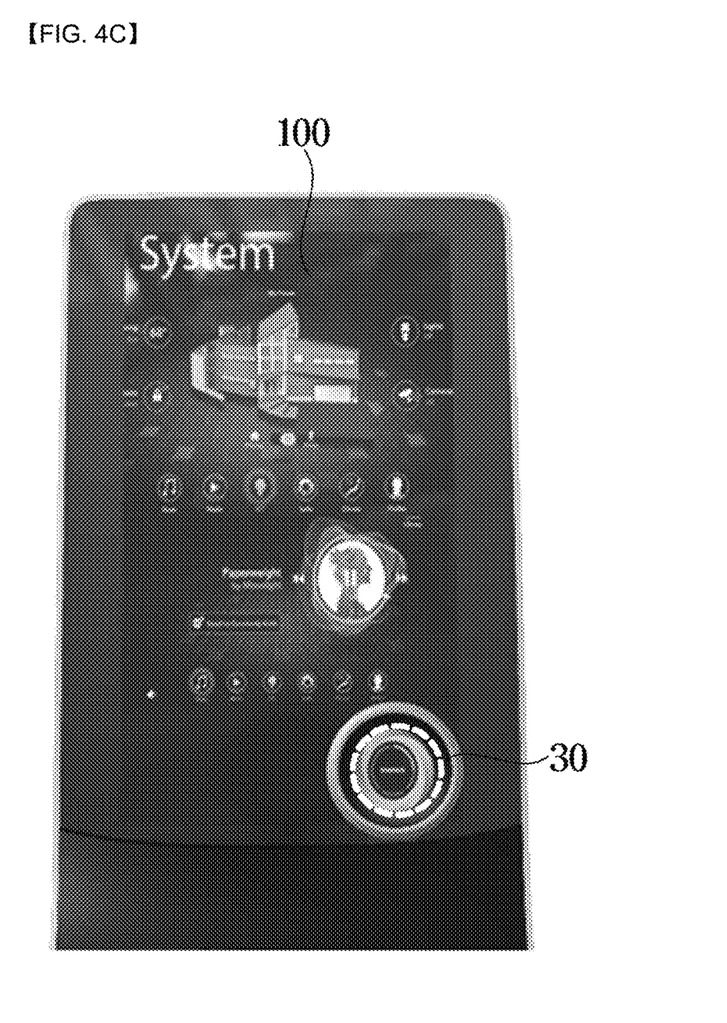

FIGS. 4A-4C are schematic views illustrating a state in which display contents are switched according to positions of a knob in a user interface device according to an embodiment of the disclosure.

In the user interface device 1000 of an embodiment of the disclosure, the user may input information by sliding the knob 200. In this case, the display 100 of the user interface device 1000 may switch display contents according to an output of the hinge sensor 500. In other words, the display 100 may switch the display contents according to the output of the hinge sensor 500 that varies depending on the position of the knob 200.

In other words, upon determining that the knob 200 is positioned at the first position 10 by the output of the hinge sensor 500 the display 100 displays a first display content predetermined, upon determining that the knob 200 is positioned at the second position 20 the display 100 displays a second display content predetermined, and upon determining that the knob 200 is positioned at the third position 30 the display 100 displays a third display content predetermined.

The first display content, the second display content and the third display content may be determined by an operation mode of the user interface device 1000 determined by the position of the knob 200. In the embodiment shown in FIG. 4, when the knob 200 is positioned at the first position 10 as shown in FIG. 4A, the user interface device 1000 may be switched to a heating, ventilation, & air conditioning (HVAC) mode for controlling indoor air conditioning of the vehicle, resulting in displaying the first display content including buttons for identifying an indoor air conditioning state and controlling an indoor air conditioning state of the vehicle. Furthermore, when the knob 200 is positioned at the second position 20 as shown in FIG. 4B, the user interface device 1000 may be switched to a navigation mode, resulting in displaying the second display content including buttons for controlling a map around current vehicle, route guidance, and navigation to a destination. When the knob 200 is positioned at the third position 30 as shown in FIG. 4C, the user interface device 1000 may be switched to a system control mode of the vehicle, resulting in displaying the third display content including buttons for identifying a current overall state the vehicle and controlling the same.

As described above, the user may change the operation mode of the user interface device 1000 by sliding the knob 200 on the display surface of the display 100, thereby changing the display contents of the display 100, and the knob 200 may be held depending on the positions of the plurality of magnets 410, 420 and 430 provided in the magnet holder 400 so as not to easily move in the corresponding positions.

Figure 5:
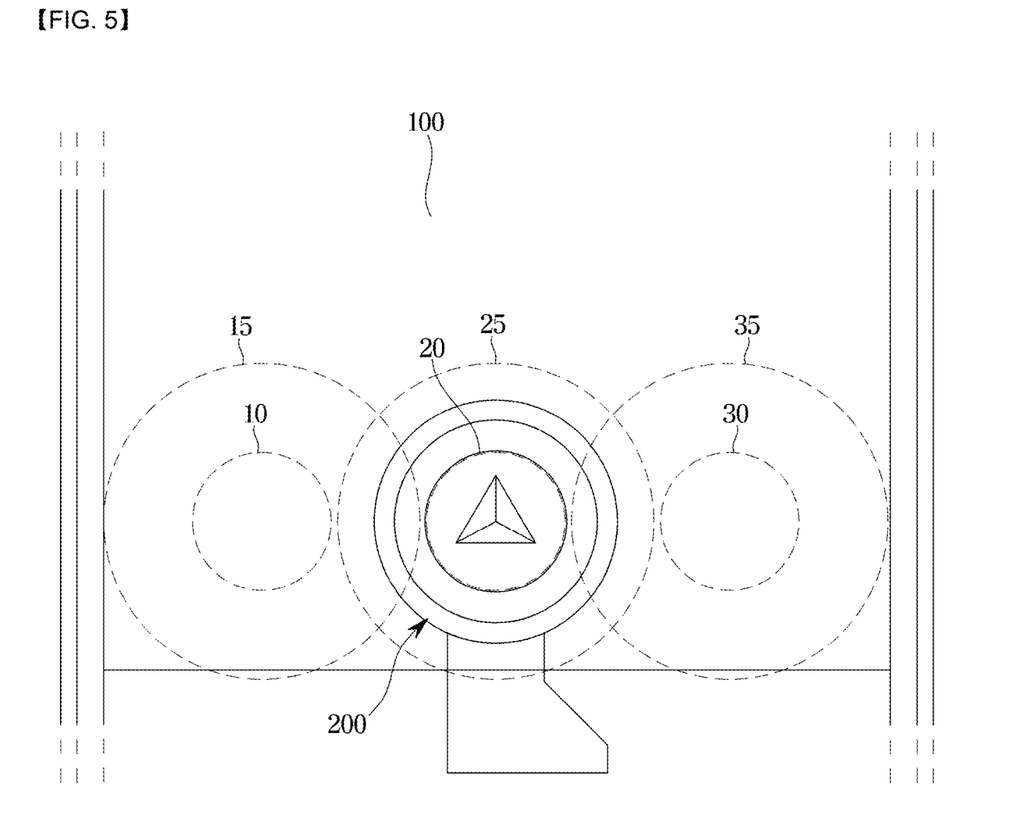
FIG. 5 is a schematic view illustrating an area set on a display of a user interface device according to an embodiment of the disclosure.
Figure 6:
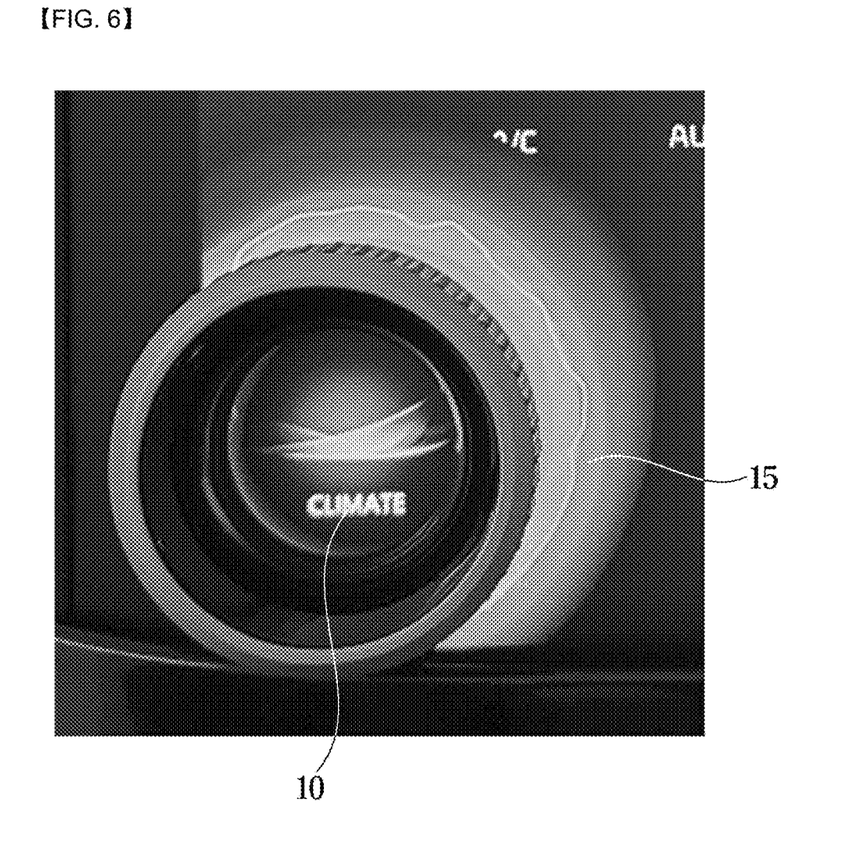
FIG. 6 is a schematic view illustrating an image displayed on a display of a user interface device according to an embodiment of the disclosure.

FIG. 5 is a schematic view illustrating an area set on a display of a user interface device according to an embodiment of the disclosure, and FIG. 6 is a schematic view illustrating an image displayed on a display of a user interface device according to an embodiment of the disclosure.

As shown in FIG. 5, the knob 200 may be held to the first position 10, the second position 20, or the third position 30 on the display surface of the display 100. As described above, the contents displayed on the display 100 may be switched depending on the positions of the knob 200. In this case, the first display content includes a first image displayed in a first area 15 including a first position 10. The second display content includes a second image displayed in a second area 25 including a second position 20, and the third display content includes a third image displayed in a third area 35 including a third position 30.

The first area 15, the second area 25 and the third area 35 may be set in the display 100, respectively. In this case, the first area 15, the second area 25 and the third area 35 include the first position 10, the second position 20, and the third position 30, respectively. In the embodiment shown in FIG. 5, the first area 15, the second area 25 and the third area 35 are set as circular areas centered at the first position 10, the second position 20 and the third position 30, respectively.

The first display content, the second display content and the third display content displayed through the display 100 may include a specific image displayed in the vicinity of the knob 200 when the corresponding display content is displayed, respectively. In this way, by displaying a specific image near the knob 200, the user can visually and clearly identify the position of the knob 200, and can easily grasp information based on the position of the knob 200.

In the embodiment shown in FIG. 5, since the knob 200 is positioned at the second position 20, the display 100 displays the second display content. At this time, since the second display content includes the second image displayed in the second area 25, the second image is displayed in the second area 25.

On the other hand, the knob 200 may include a hollow portion 290 as shown in FIG. 2. As such, in the knob 200 including the hollow portion 290, the first image, the second image, and the third image may be seen through the hollow portion 290. According to an embodiment of the disclosure, the first to third images displayed to be seen through the hollow portion 290 may include icons and characters indicating the current operation mode of the user interface apparatus 1000. In the embodiment shown in FIG. 5, since the knob 200 is positioned at the second position 20, the user interface device 1000 may operate in the navigation mode, and the second image including a navigation icon and a NAVIGATION character may be displayed at the position corresponding to the hollow portion 290 of the knob 200. At the same time, in the second area 25 corresponding to the outside of the knob 200, the second image of a gradation color surrounding the knob 200 to emphasize the periphery thereof may be displayed.

Referring to FIG. 6, when the knob 200 is in the first position 10, as shown in FIG. 5, the appearance of the first image displayed in the first area 15 adjacent to the knob 200 may be identified. As shown in FIG. 6, the first image is displayed not only to the first position 10 where the knob 200 is positioned, but also to the first area 15 that is extended to the vicinity thereof including the first position 10, thereby focusing a user's gaze to the position where the knob 200 is positioned.

As is apparent from the above, the user interface device 1000 according to an embodiment of disclosure may change the display contents by receiving an input by the position of the knob 200 in addition to the rotation input of the knob 200 through the knob 200 sliding on the display 100.

Further, the user interface device 1000 according to an embodiment of disclosure may hold the knob 200 that slides using a magnet at a predetermined position.

Further, the user interface device 1000 according to an embodiment of disclosure may change the display contents depending on the positions of the knob, and display an image at the position of the knob to intuitively provide information to the user.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface device, comprising:
a display;
a rail extending in a first direction parallel to the display at one side of the display;
a hinge configured to slide along the rail in the first direction;

a knob coupled to the hinge to slide in the first direction on a display surface of the display and configured to detect a rotation input; and a magnet holder disposed to face the hinge in a second direction and extending in the first direction;

wherein the first magnet is provided on the hinge, the magnet holder is provided with a second magnet and a third magnet, the second and third magnets have different magnetic poles from that of the first magnet on facing surface thereagainst, and the first magnet reacts by an magnetic force of the second and third magnets so that the knob is held to a first position or a second position, respectively, on the display surface of the display, wherein the user interface device further comprising a hinge sensor configured to detect a position of an extension portion extending to one side from the hinge, wherein the hinge sensor includes a plurality of sensors fixed to the hinge sensor fixing portion, wherein the number a sensors of the hinge sensor match the number of magnets provided in the magnet holder and each sensor of the hinge sensor detect the extension portion of hinge fixed by each magnet of the magnet holder.

2. The user interface device of claim 1, wherein a display content displayed on the display is switched depending on an output of the hinge sensor.

3. The user interface device of claim 1, wherein upon determining that the knob is positioned at the first position by the output of the hinge sensor, the display displays a first display content predetermined, and upon determining that the knob is positioned at the second position, the display displays a second display content predetermined.

4. The user interface device of claim 3, wherein the first display content includes a first image displayed in a first area including the first position.

5. The user interface device of claim 3, wherein the second display content includes a second image displayed in a second area including the second position.

6. The user interface device of claim 3, wherein the knob includes a hollow portion, the first display content includes a first image displayed on the first position, the second display content includes a second image displayed on the second position, and the first and second images are seen through the hollow portion.

7. The user interface device of claim 1, wherein further comprising a case in which the rail and the magnet holder are accommodated therein so as not to be exposed to the outside.

8. The user interface device of claim 1, wherein the knob is configured to slide while spacing apart from the display surface of the display by a predetermined distance.

* * * * *